United States Patent Office 3,242,152
Patented Mar. 22, 1966

3,242,152
POLYMERIZATION OF PURIFIED ACRYLAMIDE MONOMER, THE RESULTING POLYACRYLAMIDE, AND PROCESS FOR FLOCCULATING SUSPENDED SOLIDS THEREWITH
Mayer B. Goren, Denver, Colo., assignor to Kerr-McGee Oil Industries, Inc., a corporation of Delaware
No Drawing. Filed Feb. 28, 1961, Ser. No. 92,139
5 Claims. (Cl. 260—89.7)

This invention relates to a process for purifying acrylamide monomer and to the preparation of high molecular weight polyacrylamides possessing superior thickening and flocculating properties.

This application is a continuation-in-part of my copending application Serial No. 755,120, filed August 15, 1958, now abandoned.

Several methods are known for preparing polyacrylamide. For instance, methods for the preparation of polyacrylamide are disclosed in U.S. Patent 2,625,529, and an article by Michaels appearing on pages 1485–1490 of the July 1954 issue of "Industrial and Engineering Chemistry." In general, the prior art methods may be classified as modifications of either the bulk polymerization process or the dilute polymerization process. As is well known, polyacrylamides produced by the bulk polymerization process are invariably rigid, intractable gells of minimal swellability and dispersibility in water. Therefore, such polyacrylamide products are generally considered to be useless as flocculants, adhesives and thickeners.

The above-mentioned dilute polymerization process affords products which are satisfactory flocculating agents when compared with natural products such as glue, starch and various vegetable gums. These products also have found uses as mucilages, adhesives, thickening agents, etc. However, the prior art processes are unsatisfactory due to the relative irreproducibility of polymerization conditions and thus the resulting product. The non-reproducibility of these processes manifests itself in many ways such as, for example, either short or extremely long induction periods before polymerization is initiated, variable rates of polymerization with resultant differences in the rate of heat evolution and its related effect on molecular weight of the product, differences in degree of conversion of monomer, and differences in the physical properties of the resulting polymer occasioned by differences in molecular weight, branching, etc.

It is extremely difficult to prepare the more desirable polyacrylamide polymers such as those of relatively high molecular weight, i.e., polymers having a molecular weight above 1,000,000, by the prior art processes. Such high molecular weight products have greater utility in industrial uses and also are more valuable for many of the applications mentioned hereinbefore, and especially as flocculating agents. High molecular weight polymers having molecular weights of the order mentioned above are very effective flocculating agents in hydrometallurgical processes involving a fluocculation step.

In my United States patent application Serial No. 543,263, now abandoned, in one important embodiment of the invention, I have described methods of polymerizing relatively concentrated aqueous solutions of acrylamide at elevated temperatures and in the presence of persulfate catalyst as initiators to provide a satisfactory water-swellable and dispersible polyacrylamide product. Analysis of the various physical factors operative in such phenomena as thickening of aqueous solutions, adhesion, and flocculation and agglomeration suggests that, all other factors being equal, the higher the molecular weight of a given water-soluble polymer the more effective should be the material in these applications. In an attempt to prepare even higher molecular weight polyacrylamides than those described in the above-mentioned application Serial No. 543,263, I have examined the polymerization of concentrated aqueous acrylamide solutions at low temperature and high monomer to catalyst ratios employing redox polymerization initiators. As is well known to those skilled in the art, such conditions ordinarily lead to the production of higher molecular weight polymers.

For reasons not fully understood at the present time, treatment of acrylamide solutions under the above-mentioned conditions results in considerable variation in polymerization behavior and leads to products which are even more highly cross-linked or branched than products prepared under similar conditions but at relatively high temperature. Redox polymerization of concentrated acrylamide solutions at low or ambient temperatures may lead to rigid, intractable gels which exhibit only minimal swelling in water and cannot be dispersed, and in such instances the products may be undesirable as thickening agents, adhesives, flocculants and agglomerants. Prior to the present invention, there was no known process suitable for the preparation of extremely high molecular weight polyacrylamides useful in the above-mentioned processes.

It is an object of the present invention to provide a method of polymerizing acrylamide monomer which allows reproducible results to be obtained.

It is still a further object of the present invention to prepare in a reproducible manner gelled, water-swellable and water-dispersible polyacrylamides of exceptionally high molecular weight which are highly effective as flocculating agents.

It is still a further object of the present invention to provide a process for polymerizing acrylamide wherein the induction period and rate of reaction may be controlled to thereby permit gelling of the polyacrylamide and yet obtain an extremely high molecular weight polyacrylamide which is swellable and dispersible in water and which exhibits superior flocculating properties when compared with glue or polyacrylamide prepared by polymerization of dilute aqueous acrylamide solutions.

Still other objects and advantages of the present invention will be apparent to those skilled in the art upon reference to the following detailed description.

In accordance with one important embodiment of the present invention, I have discovered that the inconstant, erratic behavior of acrylamide polymerization systems is due to the presence of variable but minute quantities of impurities in commercial acrylamide which are apparently both organic and inorganic in nature. The manner in which these impurities effect changes in the course of the acrylamide polymerization is not fully understood, nor do they always seem to function in the same manner. This suggests that perhaps individual impurities may not function alone but in combination with one or more additional impurities to achieve certain observed effects. Nevertheless, it is easily demonstrated that if the acrylamide monomer is carefully prepared for polymerization by purification in a manner which effectively separates the acrylamide monomer from the contained impurities, many of the differences in the behavior of different samples of commercial acrylamide monomer may be eliminated and reproducible results obtained upon polymerization. Acrylamide monomer is derived by hydration of acrylonitrile with sulfuric acid followed by neutralization, as disclosed in the Condensed Chemical Dictionary, Fifth Edition, published by Reinhold Publishing Corporation, New York, 1946.

The factors which give rise to formation of the intractable gels mentioned above also are not wholly understood at the present time and they likewise appear to be due to a number of reasons. It may be that considerable branching and even cross-linking of a polyacrylamide chain is caused by chain transfer with the preformed or actively growing polymer molecules due to the activation of alpha hydrogen. This would be especially true in concentrated solutions and would reach its ultimate level in the bulk polymerization of acrylamide, this process rarely leading to a soluble product. Other branching and cross-linking mechanisms may be advanced such as an imidization process involving adjacent chains of polymer molecules. As disclosed in my copending application Serial No. 755,120, filed August 15, 1958, I have found that aggravated branching and cross-linking which attends polymerization at high or moderately high concentrations of even properly purified acrylamide monomer may be reduced through the addition of catalytic quantities of certain weakly alkaline substances such as ammonium hydroxide to the polymerizing solution so that the product has an optimum amount of branching or cross-linking consistent with good dispersibility in water and activity for uses such as fluocculants. It is believed that this expedient reduces the level of branching and cross-linking which may be contributed to by chain transfer or inter-chain imidization. Due to processing ease, polymerization rate and ease of handling, it is desirable to effect polymerization at the highest practical concentration of monomer.

It has been discovered that a major contributor to the formation of intractable, insoluble or water indispersible polymer is an impurity, apparently organic in nature, that is present to varying degrees in all commercial acrylamide monomer products. The exact nature of this impurity is not known at the present time but it appears to be a di- or polyolefin. In my copending application Serial No. 543,263, above-mentioned, it has been demonstrated that very small quantities of diolefins such as methylene-bis-arcylamide may be employed for the purpose of obtaining desirable levels of cross-linking and branching upon polymerization of acrylamide monomer in relatively dilute solutions such as about 10%. However, levels of diolefin which are beneficial at low concentration of acrylamide monomer have been found to effect insolublization of polymer produced in polymerizing more concentrated solutions. Thus, the apparent dual nature of the factors contributing to aggravated branching and cross-linking of commercial acrylamide samples upon polymerization appears to be chain transfer with preformed or growing polymer or inter-chain imidization, and cross-linking effected by diolefinic or other impurities in the acrylamide monomer.

It has been further discovered that commercial acrylamide monomer may be effectively purified from contaminate inorganic and organic impurities which apparently cause the above-mentioned difficulties by careful fractional crystallization from a mixed solvent such as ethyl acetate-benzene, or by the more effective and simple method of sublimation or distillation at reduced resure. The acrylamide monomer product purified in accordance with the present invention may be polymerized at high concentrations and at relatively low temperature to yield a soluble polymer product of extremely high molecular weight that possesses excellent fluocculating properties, among other highly desirable properties. On the other hand, admixture of nonvolatile residue from the sublimation step or impure monomer with the sublimate followed by polymerization under the same conditions results in formation of the usual intractable, insoluble acrylamide polymer which is useless for purposes discussed above such as flocculating agents.

One very important benefit derived from purification of commercial acrylamide monomer in accordance with the present invention lies in the elimination of variables in polymerization characteristics which are contributed by traces of inorganic materials. Although such substances are present in extremely small amounts inorganic materials such as salts containing iron, copper, nickel, etc., nevertheless have been found to induce pronounced effects in the course of polymerization. It has been discovered that sublimation or distillation at reduced pressure effectively eliminates these substances from the monomer and reproducible results may be obtained upon polymerization. As a consequence, purified monomer may be "doctored" with known, exact amounts of desired metal ions which are known to have beneficial effects. Uniformity of process control is thereby simply achieved and the course of the polymerization, induction period, polymerization rate, heat evolution, etc., may be predicted with vastly improved accuracy. For example, it has been discovered that trace amounts of copper sulfate, ferric chloride or other water-soluble salts of copper and iron may be added to the aqueous solution of purified acrylamide to control the induction period and other variables. Normally, catalytic amounts such as about 0.0001 part of such salts to 4 parts of purified acrylamide monomer gives acceptable noticeable effects. However, in actual practice, it is desirable to use several times this quantity such as 5–10 times as much. It is also advantageous to carry out the polymerization in the presence of small amounts of basic substances such as ammonium hydroxide for the purpose of facilitating formation of rigid gels which are still water-swellable and water-dispersible and thus highly effective as flocculating agents. This is especially desirable when the polymerization is carried out at high monomer concentrations such as above about 30% by weight.

The polymerization may be carried out in aqueous medium and preferably in alkaline aqueous medium having a pH of, for example, about 7.5 to 10 and for best results a pH of about 8 to 9. Small amounts of a water-soluble substance providing ammonia, ammonium hydroxide or the equivalent (for example, an ammonium salt plus base to produce free ammonia), referred to herein as "free ammonia," in an amount of about $1\times10^{-3}$ to $3\times10^{-1}$ mol and preferably $4.5\times10^{-3}$ to $1.5\times10^{-2}$ mol per mol of acrylamide monomer also should be present for best results and especially at monomer concentrations above about 15% by weight. Examples of such substances include ammonia, ammonium hydroxide, and water-soluble ammonium salts such as ammonium carbonate, bicarbonate, chloride, sulfate, etc., in the presence of alkali or other suitable base to produce free ammonia. In instances where an acidic salt is used, it is desirable to adjust the pH with base to about 7.5–10 before polymerization. If desired, the free ammonia may be formed in situ by addition of a base such as alkali metal hydroxides, carbonates and bicarbonates in an amount to provide a pH of about 7.5 to 10 and preferably a maximum of about 3.5% hydrolyzed acrylamide monomer units in the polymer. When free ammonia is formed in situ the base preferably is added in an amount to provide about $1\times10^{-3}$ to $1\times10^{-1}$ chemical equivalents and preferably $4.5\times10^{-3}$ to $1.5\times10^{-2}$ chemical equivalents of base per mol of acrylamide monomer.

Ammonia treatment in excess of about $3\times10^{-1}$ mol per mol of acrylamide may lead to loss of appreciable quantities of acrylamide by side reaction such as formation of nitrilo trispropionamide. This is particularly true when the polymerization is carried out in relatively concentrated solution but it is minimized in dilute solution. Accordingly there is an upper limit both in the mol ratio of free ammonia to acrylamide (of about $3\times10^{-1}$) as well as of the absolute free ammonia concentration (of about 0.75–1.0 molar), the combination of which should be borne in mind. The various free ammonia to acrylamide mol ratios may be employed effectively so long as the actual free ammonia concentration does not exceed about 0.75–1.0 molar. A preferred range of ratios is in the region of $4.5\times10^{-3}$ to $5\times10^{-2}$ mol free ammonia per mol acrylamide with a preferred absolute free ammonia concentration of about .05 to 0.25 molar. Under these conditions the desired effects are achieved without significant risk of encountering undesirable side reactions.

In the absence of ammonia, polymerization in aqueous solution at acrylamide monomer concentrations of 2.5–15% by weight is preferred as the resultant product is more readily water-dispersible, but concentrations in aqueous solution up to about 40% by weight may be used. At high monomer concentrations, it may be preferred that the polymerization temperature be between about 60° C. and the boiling point during at least a portion of the polymerization. In the presence of free ammonia, concentrated aqueous solutions may be polymerized at high or low temperatures to produce water-dispersible products, such as 2.5–40% by weight or higher.

An aqueous reaction mixture containing purified acrylamide to be polymerized, with or without free ammonia, may also contain small amounts of diolefins copolymerizable with acrylamide for the purpose of obtaining desirable levels of cross-linking and branching. It is further understood that such diolefins are present in amounts small enough to provide a polymerization product which is water-swellable and dispersible. The presence of free ammonia in the alkaline reaction mixture permits higher levels of the diolefins to be used than is otherwise possible.

In the examples which follow, reagent concentrations in water employed throughout are:

$K_2S_2O_8$ ---------------------------------- g./l._ 5.0
$Na_2SO_3$ ---------------------------------- g./l._ 1.0
$NH_4OH$ ---------------------------------- molar__ 3.0

Unless otherwise noted the parts reagent added to the recited parts of acrylamide monomer solution are parts by volume of the aqueous solutions of the concentrations given above. In preparing the aqueous acrylamide monomer solutions, the parts of acrylamide and water are by weight.

Example I

A typical commercial acrylamide was used in this example.

Twelve parts of the above commercial acrylamide were dissolved in 26.5 parts of distilled water and to this solution was added 5 parts of aqueous 3 M ammonium hydroxide. The charge was sparged with purified nitrogen for 20 minutes and then the polymerization catalyst was added. The catalyst comprised 0.001 part of potassium persulfate in 0.2 part of distilled water and 0.0005 part sodium sulfite in 0.5 part of water. After an induction period, the polymerization was initiated and continued until a polymerized product was obtained. The resulting acrylamide polymer was a tough, rigid, intractable gel that could not be dispersed in water even after a long soaking period with vigorous agitation. Thus, this polymer was useless as a flocculant, adhesive or thickener.

The above polymerization process was repeated several times without producing a polyacrylamide polymer that was swellable and dispersible in water.

Example II

Twelve parts of the commercial unpurified acrylamide monomer of Example I were polymerized under the conditions of Example I with the exception that 0.001 part potassium persulfide in 0.2 part of water, 0.0005 part sodium sulfite in one-half part of water and 0.5 part of three molar ammonium hydroxide were employed. The polymerized product thus obtained was a tough, rigid gel that could not be dispersed in water even after long soaking periods and with vigorous agitation.

Similar unpurified commercial acrylamide monomer samples were polymerized under similar conditions but with variations in monomer to catalyst ratios or in the presence of catalytic quantities of copper sulfate and/or ferric chloride with similar results. In every instance, the products were tough, rigid gels which could not be dispersed in water even after long soaking periods and with vigorous agitation.

Example III

A sample of unpurified commercial acrylamide identical with that used in Example I was charged to a vacuum sublimation apparatus. The vacuum sublimation apparatus was evacuated to about 1 millimeter of mercury absolute pressure and the charge was sublimed by heating at temperatures from ambient temperature to just below the melting point of the acrylamide. The rate of sublimation increased with an increase in temperature and a decrease in pressure. The purified sublimed product was collected on a cold surface or "finger" maintained in the sublimation apparatus and removed periodically. Thus, samples of purified sublimed product were obtained at periodic intervals for each temperature and pressure setting used, i.e., from ambient temperature up to 95° C. and at pressures from 0.1 to 20 millimeters of mercury absolute.

The residue from the sublimation step was found to contain traces of ammonium sulfate, low grade water-soluble polyacrylamide, *water-insoluble polymer,* small quantities of water-soluble organic substances giving a positive Baeyer test, e.g., having a pronounced reducing power for aqueous potassium permanganate (this being typical of olefinic materials), and various trace metals such as iron, copper and nickel.

Example IV

Four parts of the sublimed acrylamide of Example III were dissolved in ten parts of water and to this solution was added 0.25 part of 3 M ammonium hydroxide, 0.00001 part of copper sulfate pentahydrate and 0.00005 part of ferric chloride hexahydrate. After lengthy sparging with nitrogen, 0.00075 part of potassium persulfate and 0.00025 part of sodium sulfite were added. After sparging with purified nitrogen at ambient temperature for 16 hours, a rigid gel formed and this gel was heated at 65° C. for an additional 14 hours. The gelled product was cut into thin slices which were found to be readily dispersible in water after short soaking periods to thereby yield a highly viscous solution at a polymer concentration as low as 0.25%. This solution was tested on uranium leach liquor and found to possess superior flocculant properties.

A second polymerization was carried out under the above conditions using the sublimed acrylamide of Example III. Upon addition of the potassium persulfate and sodium sulfite, polymerization began in less than one minute with steadily increasing viscosity until the product, because of concentration and molecular weight, was a rigid gel (about 1½ hours). After 3 additional hours, the product then was heated to 65° C. for 15 more hours to complete the polymerization. The product readily dispersed in water to afford a highly viscous solution which was an excellent flocculant for slimes derived in the acid leaching of uranium ore.

Although highly purified acrylamide monomer samples may be obtained by sublimation or distillation under reduced pressure and then polymerized satisfactorily under ordinary conditions, they invariably exhibit long induction periods before polymerization is initiated. Often, induction periods as long as several hours are noted. The induction period may be shortened markedly by incorporating into the solution to be polymerized trace quantities of copper sulfate, ferric chloride or other copper and iron salts.

Example V

The residue from one of the sublimation runs in Example III when using 12 parts of commercial acrylamide amounted to 0.15 part of residue. This residue (0.15 part) was mixed with 4.0 parts of purified sublimed acrylamide monomer from Example III and then polymerized under the conditions of Example IV. The polymer thus prepared, upon soaking in water for a 48 hour period, was not dispersible to yield an aqueous dispersion which was a satisfactory flocculant for hydrometallurgical slimes.

*Example VI*

Another sample of unpurified commercial acrylamide monomer identical with that of Example I was dissolved in a hot mixture of equal parts of benzene and ethyl acetate. A saturated solution at elevated temperature was allowed to cool to thereby precipitate crystals of acrylamide. The acrylamide crystals were freed of the mother liquor by decantation and were then washed with fresh mixed solvent. The purified crystals thus obtained were used in polymerization tests to give reproducible samples of polyacrylamide which gelled but were water-dispersible. These samples exhibited superior flocculant properties for hydrometallurgical slimes when compared with the best commercial flocculants.

*Example VII.—Polymerization of acrylamide at high concentration*

(a) 12 parts of purified acrylamide were dissolved in 27 parts of water and the solution sparged with purified nitrogen for 20 minutes, whereupon 0.5 part $K_2S_2O_8$ solution and 1.0 part $Na_2SO_3$ solution were added. Sparging was continued for 15 hours during which the solution set to a rigid gel. It was then heated for 24 hours at 65° C. The product so obtained was a thoroughly crosslinked and gelled material, which when cut into small pieces and agitated in water exhibited only a minimum of swelling and could not be dispersed.

(b) 12 parts of purified acrylamide were dissolved in 26 parts of water and 1.0 part of 3 M $NH_4OH$ added. The solution was sparged as in (a) for 20 minutes and to it were added 0.5 part $K_2S_2O_8$ solution in 1.0 part $Na_2SO_3$ solution. Sparging was continued for 15 hours and the product was then heated as in (a). Although physically resembling the product (a) above, the polymer obtained in the presence of ammonia dissolved completely on soaking and agitating in water to give a very viscous solution exhibiting inordinately high flocculating activity.

*Example VIII*

One part acrylamide was dissolved in 10 parts water, sparged with purified nitrogen and 0.5 part of a 5.0 g./liter potassium persulfate reagent was added, followed in 30 seconds by 0.1 part of a 1.0 g./liter sodium sulfite solution. Polymerization proceeded slowly over a period of four days at room temperature, after which time a firm gel had formed. The product swelled and dispersed on prolonged soaking (three days) in water to give a fairly satisfactory flocculant solution for hydrometallurgical slimes.

*Example IX*

One part acrylamide was dissolved in 36.5 parts water, 1 part of a 5.0 g./liter potassium persulfate reagent was added and the solution sparged with nitrogen for 15 minutes, whereupon 0.2 part of a 1.0 g./liter sodium sulfite reagent was added. Polymerization proceeded slowly over a twenty-four hour period and then the product was heated at 65° for another nine hours to complete the polymerization. A thick solution resulted which when diluted possessed fairly satisfactory flocculant properties for hydrometallurgical slimes.

*Example X*

1.0 part of a highly purified acrylamide sample was dissolved in 20 parts of water, sparged with nitrogen for 10 minutes when 1.0 part of $K_2S_2O_8$ solution was added. Sparging was continued and after five minutes 1.0 part of the $Na_2SO_3$ solution was added. During a period of 80 minutes there was no evidence of polymerization, and after 7½ hours only slight increase in viscosity was evident. The mixture was sparged for 48 hours at ambient temperature and then heated for 15 hours at 60° C. When dispersed to 0.5% concentration in water the product had very little viscosity.

*Example XI*

The conditions of Example X were duplicated with a second sample of highly purified acrylamide except that 0.5 part of 3 Molar $NH_4OH$ were added to the solution before the initiator and activator were added. There followed an induction period of less than seven minutes when viscosity increase became evident. The polymerization was continued and completed as in Example X and the product was a firm semi-gel which was readily dispersed to 0.5% concentration.

*Example XII*

To one-half the 0.5% solution of product from Example X there was added 0.5 part of 15 Molar $NH_4OH$ (equivalent to the ammonia concentration achieved in the polymerizing solution of Example XI). The solution thus treated was heated in a closed vessel at 60° C. for 15 hours to determine whether such treatment would convert the product of Example X into one identical to that of Example XI. The results are noted in Example XIV below.

*Example XIII*

(a) 1 part of highly purified acrylamide was dissolved in 20 parts distilled water and 0.1 part sodium bicarbonate was added. After proper sparging with purified nitrogen, 1 part of $K_2S_2O_8$ solution and 1 part of $Na_2SO_3$ solution were added as before. After about twelve hours, during which only minimal viscosity increase was evidenced, an additional 0.4 part of sodium bicarbonate was added and sparging was continued for 48 hours, when the now very viscous product was heated at 60° C. for 15 hours. The product was a semi-rigid gel which was readily dispersed to 0.5% concentration.

(b) 1.0 part of acrylamide was dissolved in 10 parts of water containing 0.07 parts $Na_2CO_3$. While sparging with nitrogen, 0.5 part $K_2S_2O_8$ and 0.1 part $Na_2SO_3$ were added. Initiation of polymerization was evident in about four minutes. The course of polymerization followed that of Example IV closely. At the end of polymerization, ammonia was detected in the gas space above the polymer in the reaction vessel.

It is evident from a comparison of parts (a) and (b) of this example that alkali carbonates are considerably more effective than are the bicarbonates.

*Example XIV*

Comparison of properties of products derived from Examples X–XIII inclusive.

(a) Relative viscosities of the 0.5% solutions of products were determined by timing the rate of flow of a constant volume of polymer solution through a pipet as compared with the flow time for distilled water under the same conditions, the relative viscosity being the time of flow of the polymer solution divided by the solvent flow-time.

| Product from Example No. | Flow Time (sec.) | Relative Viscosity (0.5% sol'n.) |
|---|---|---|
| Water | 20.9 | |
| X | 23 | 1.1 |
| XI | 110 | 5.25 |
| XII | 45 | 2.15 |
| XIII-a | 32.5 | 1.55 |

It is thus evident that ammonia treatment of the product of Example X does not convert it into a product equivalent to that obtainable by the incorporation of the ammonia during the polymerization step.

(b) Flocculating activity.

A standard slimes sample was prepared from a Carlsbad, New Mexico, potash ore relatively rich in clay and hematite slimes by leaching the ore in warm water until it was largely dissolved and screening out and discarding the +100 mesh fraction. Fifty ml. aliquots of the slurry containing the −100 mesh slimes were diluted to 250 ml. with water and well mixed to afford a dilute slime suspension at 0.8% solids. Such a slimes suspension gives no evidence of settling over a prolonged period of time.

For comparing the flocculating activity of the preceding products, 1.0 ml. aliquots of the 0.5% solution of each were diluted to 50.0 ml. with water and sufficient portions of these .01% solutions added to the slime suspensions to achieve recognizable levels of flocculation. The slimes and flocculant were well mixed and the slimes allowed to settle to the 250 ml. mark, whereupon the rate of settling was recorded for various dosage levels.

PRODUCT OF EXAMPLE X

| Slime Ht. (ml.) | Time in seconds at indicated polymer dosage | | |
|---|---|---|---|
| | 10 ml. | 15 ml. | 20 ml. |
| 250 | 0 | 0 | 0 |
| 230 | 30 | 24 | 22 |
| 210 | 55 | 52 | 45 |
| 190 | 80 | 80 | 65 |
| 170 | 115 | 105 | 85 |
| 150 | 145 | 135 | 108 |

PRODUCT OF EXAMPLE XI

| Slime Ht. (ml.) | Time in seconds at indicated polymer dosage | | | |
|---|---|---|---|---|
| | 1 ml. | 2 ml. | 3 ml. | 4 ml. |
| 250 | 0 | 0 | 0 | 0 |
| 230 | 38 | 21 | 9 | 3 |
| 210 | 67 | 32 | 13 | 5 |
| 190 | 90 | 42 | 19 | 8 |
| 170 | 112 | 53 | 25 | 11 |
| 150 | 139 | 62 | 30 | 14 |

PRODUCT OF EXAMPLE XII

| Slime Ht. (ml.) | Time in seconds at indicated polymer dosage | |
|---|---|---|
| | 5 ml. | 10 ml. |
| 250 | 0 | 0 |
| 230 | 22 | 10 |
| 210 | 33 | 19 |
| 190 | 47 | |
| 170 | 54 | 30 |
| 150 | 63 | 33 |

PRODUCT OF EXAMPLE XIII-A

| Slime Ht. (ml.) | Time in seconds at indicated polymer dosage | |
|---|---|---|
| | 5 ml. | 10 ml. |
| 250 | 0 | 0 |
| 230 | 29 | 22 |
| 210 | 45 | 34 |
| 190 | 62 | 50 |
| 170 | 77 | 62 |
| 150 | 93 | 76 |

From the foregoing it is evident that by far the most superior flocculating activity is possessed by the product of Example XI which was as effective as the product of Example X when employed at a tenth the dosage of the latter. Subsequent ammonia treatment of the product of Example X confers improved flocculating characteristics, but it is still nevertheless only about one-fifth as effective as the polymer prepared directly in the presence of ammonia. The bicarbonate-promoted polymerization likewise affords an improved product (Example XII)—about 40% as active as the ammonia-promoted polymer.

What is claimed is:

1. A process for preparing a high molecular weight water swellable and dispersible homopolymer from acrylamide monomer, the acrylamide monomer being prepared by hydration of acrylonitrile with sulfuric acid followed by neutralization, the acrylamide monomer containing impurities less volatile than acrylamide monomer selected from the group consisting of inorganic salts and organic olefinic substances copolymerizable with acrylamide monomer, comprising the steps of removing the impurities from the acrylamide monomer by sublimation, and homopolymerizing and purified acrylamide monomer in an aqueous medium containing initially about 2.5–40% by weight of acrylamide monomer in the presence of a free radical catalyst at least one substance selected from the group consisting of (1) free ammonia in an amount of about $1 \times 10^{-3}$ to $3 \times 10^{-1}$ mol per mol of acrylamide monomer and in a concentration not exceeding about 1.0 molar and (2) ammonium carbonate, ammonium bicarbonate and alkali metal hydroxides, carbonates and bicarbonates in an amount to provide a pH of about 7.5 to 10 to produce a high molecular weight water swellable and dispersible homopolymerization product which produces a highly viscous aqueous medium when dispersed in water.

2. The process of claim 1 wherein the aqueous medium contains initially about 2.5–15% by weight of acrylamide monomer.

3. A process for preparing a high molecular weight water swellable and dispersible homopolymer from acrylamide monomer, the acrylamide monomer being prepared by hydration of acrylonitrile with sulfuric acid followed by neutralization, the acrylamide monomer containing impurities less volatile than acrylamide monomer selected from the group consisting of inorganic salts and organic olefinic substances copolymerizable with acrylamide monomer, comprising the steps of removing the impurities from the acrylamide monomer by sublimation, and homopolymerizing the purified acrylamide monomer in an aqueous medium containing initially about 15–40% by weight of acrylamide monomer in the presence of a free radical catalyst and at least one substance selected from the group consisting of (1) free ammonia in an amount of about $1 \times 10^{-3}$ to $3 \times 10^{-1}$ mol per mol of acrylamide monomer and in a concentration not exceeding about 1.0 molar and (2) ammonium carbonate, ammonium bicarbonate and alkali metal hydroxides, carbonates and bicarbonates in an amount to provide a pH of about 7.5 to 10 to produce a high molecular weight water swellable and dispersible homopolymerization product which produces a highly viscous aqueous medium when dispersed in water.

4. The process for preparing polyacrylamide of claim 1 wherein the polymerization is carried out in the presence of a catalytic amount of an added metal salt selected from the class consisting of the salts of iron and copper.

5. The process for preparing polyacrylamide of claim 3 wherein the polymerization is carried out in the presence of a catalytic amount of an added metal salt selected from the class consisting of the salts of iron and copper.

(References on following page)

References Cited by the Examiner

UNITED STATES PATENTS

| | | | |
|---|---|---|---|
| 2,120,933 | 6/1938 | Dittmar | 260—89.7 |
| 2,289,540 | 7/1942 | Dittmar et al. | 260—89.7 |
| 2,775,579 | 12/1956 | Erchak | 260—80 |
| 2,831,841 | 4/1958 | Jones | 260—89.7 |
| 2,865,960 | 12/1958 | Shearer | 260—89.7 |

OTHER REFERENCES

Wise, "Introduction to Organic Research," D. Van Nostrand Co., Inc., New York, N. Y., p. 289, 1924.

JOSEPH L. SCHOFER, *Primary Examiner.*

H. N. BURSTEIN, WILLIAM H. SHORT, LEON J. BERCOVITZ, *Examiners.*